United States Patent
Saotome et al.

(10) Patent No.: US 6,502,027 B2
(45) Date of Patent: Dec. 31, 2002

(54) ROAD GRADIENT DETECTING DEVICE AND STARTER CLUTCH CONTROLLING DEVICE

(75) Inventors: Hiroshi Saotome, Saitama (JP); Shuichi Fujimoto, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 57 days.

(21) Appl. No.: 09/748,187

(22) Filed: Dec. 27, 2000

(65) Prior Publication Data

US 2001/0005805 A1 Jun. 28, 2001

(30) Foreign Application Priority Data

Dec. 28, 1999 (JP) .......................... 11-372680

(51) Int. Cl.[7] .............................................. G06F 17/00
(52) U.S. Cl. .................. 701/67; 701/65; 701/95; 477/167
(58) Field of Search ...................... 701/67, 53, 65, 701/94, 95; 477/39, 167

(56) References Cited

U.S. PATENT DOCUMENTS

| 5,170,868 | A | * | 12/1992 | Yamashita et al. | ........ 192/82 T |
|---|---|---|---|---|---|
| 5,364,321 | A | * | 11/1994 | Togai et al. | ................... 477/42 |
| 5,609,543 | A | * | 3/1997 | Aoki et al. | ................... 477/45 |
| 5,679,099 | A | * | 10/1997 | Kato et al. | ................. 192/54.3 |
| 6,169,949 | B1 | * | 1/2001 | Sato | ........................... 477/107 |

FOREIGN PATENT DOCUMENTS

| JP | 62-216842 | 9/1987 |
|---|---|---|
| JP | 1-244930 | 9/1989 |
| JP | 6-26943 | 4/1994 |
| JP | 9-207735 | 8/1997 |
| JP | 9-210093 | 8/1997 |

* cited by examiner

*Primary Examiner*—Michael J. Zanelli
*Assistant Examiner*—Eric M Gibson
(74) *Attorney, Agent, or Firm*—Arent Fox Kintner Plotkin & Kahn, PLLC

(57) ABSTRACT

When a starter clutch slips, a wheel driving force is calculated based on a transmitting torque of the clutch obtained from not an engine torque but the clutch pressure (engagement force) of the starter clutch (S21-12), whereby a road gradient is calculated using the driving force so calculated and an acceleration of a vehicle.

6 Claims, 8 Drawing Sheets

ROAD GRADIENT DETECTING DEVICE AND STARTER CLUTCH CONTROLLING DEVICE

BACKGROUND OF THE INVENTION

1. Field of the Invention

The present invention relates to a road gradient detecting device applicable to an automotive vehicle in which wheels are driven by an engine via a transmission device having a starter clutch interposed therein and a starter clutch controlling device using the road gradient detecting device.

2. Description of the Related Art

Conventionally known as a starter clutch controlling device is a starter clutch controlling device in which a starter clutch is brought into engagement even under a specific running condition where an engine is in an idling state and the vehicle speed is equal to or slower than a predetermined value and in which the engagement force of the starter clutch while an automotive vehicle is at a stop with a brake pedal being depressed is reduced lower than when the brake pedal is not depressed in order to eliminate vibrations of a vehicle body and deterioration in fuel economy which both result from a creep torque while brakes are in operation (refer to JP-A-62-216842 and JP-A-1-244930).

In this starter clutch controlling device, when the brakes are released, the engagement force of the starter clutch increases and the creep torque is restored to an original magnitude, but the engagement force of the starter clutch does not increase instantaneously, and there occurs a slight time lag before the creep torque is restored to the original magnitude. Here, when trying to start a vehicle from an ascending slope, if there occurs a time lag as described above in restoration of the creep torque to the original magnitude after the release of the brakes, there may occur a case in which the driver has to depress the accelerator pedal after he or she releases the brakes in order to obtain a torque counteracting against a reverse torque generated by the gravity of the vehicle.

Then, in order to improve the operability at the time of starting off the vehicle., there is known a starter clutch controlling device in which a means for detecting the gradient of a road is provided which is adapted to prohibit the engagement force of a starter clutch provided when the brakes are applied from decreasing when the gradient of a road is an ascending gradient of a predetermined value or greater (JP-A-9-210093).

In addition, JP-A-9-207735 discloses a road gradient detecting device for controlling shifting of an automatic transmission in which the gradient of a road is calculated from a wheel driving force and acceleration of the vehicle.

Although it is conceived that the above road gradient detecting device is used as a road gradient detecting means for a starter clutch without using any specific sensor, the detecting device calculates a wheel driving force based on an output torque of the engine, and the device cannot accurately calculate a wheel driving force in a state in which the starter clutch slips when the vehicle runs at such low speed as it is easily brought to a stop or when the vehicle slows down, thus making it impossible to secure the required road gradient calculating accuracy. Due to this, there may be caused a risk that the control of the starter clutch in response to the gradient of a road where the vehicle is stopped cannot be performed properly.

SUMMARY OF THE INVENTION

The present invention was made in view of the above situation, and a first object of the invention is to provide a road gradient detecting device adapted to accurately calculate a road gradient even in a state in which a starter clutch slips. A second object of the invention is to provide a starter clutch controlling device adapted to properly perform the control of a starter clutch in response to the gradient of a road where the vehicle is stopped.

With a view to solving the first object, according to a first aspect of the invention, there is provided a road gradient detecting device applicable to an automotive vehicle in which wheels are driven by an engine via a transmission device having a starter clutch interposed therein, wherein a gradient of a road is calculated from a wheel driving force and vehicle acceleration, the road gradient detecting device comprising a first driving force calculating means for calculating a wheel driving force based on an output torque of the engine, and a second driving force calculating means for calculating a driving force based on a torque transmitted by the starter clutch which is obtained from an engagement force of the starter clutch, the wheel driving force calculated by the second driving force calculating means being used for calculating a road gradient in a state in which the starter clips.

In addition, with a view to solving the second object, according to the invention, there is provided a starter clutch controlling device for controlling the engagement force of a starter clutch interposed in a transmission device for transmitting an output torque of an engine to wheels, comprising a first controlling means for reducing the engagement force of the starter clutch when an automotive vehicle is at a stop with a brake pedal being depressed lower than when the brake pedal is not depressed, a road gradient detecting means for detecting the gradient of a road, and a second controlling means for increasing the engagement force of the starter clutch when the automotive vehicle is at a stop with the brake pedal being depressed to a value greater than a value obtained by the first controlling means in a case where the gradient of a road is an ascending gradient of a predetermined value or greater, wherein the road gradient detecting device as set forth in the first aspect of the invention is used as the road gradient detecting means.

When the starter clutch slips, a torque exceeding a transmitting torque of the starter clutch cannot be transmitted to wheels, and the wheel driving force becomes a torque corresponding to the transmittable torque of the starter clutch. However, according to the road gradient detecting device of the invention, in the state in which the starter clutch slips, a wheel driving force for use in calculation of the gradient of a road is calculated based on the transmittable torque of the starter clutch, and therefore even if the starter clutch slips, a wheel driving force can be calculated accurately to thereby secure a required accuracy at which a road gradient is calculated.

In addition, according the starter clutch controlling device of the invention, while the vehicle is stopped with the brake pedal being depressed, if the gradient of a road is an ascending gradient of a predetermined value or greater, the gradient can securely be detected and the engagement force of the starter clutch can be controlled to be a value provided by the second controlling means. Thus, the control of the starter clutch can properly be performed in response to the gradient of a road where the vehicle is stopped.

Note that in an embodiment that will be described later, what corresponds to the first driving force calculating means is a step designated as S21-6 in FIG. 6, and what corresponds to the second driving force calculating means is a step designated as S21-12 in FIG. 6, what corresponds to the first controlling means is a step designated as S8 in FIG. 3, and what corresponds to the second controlling means is a step designated as S9 in FIG. 3.

DETAILED DESCRIPTION OF THE PREFERRED EMBODIMENTS

Figure 1:
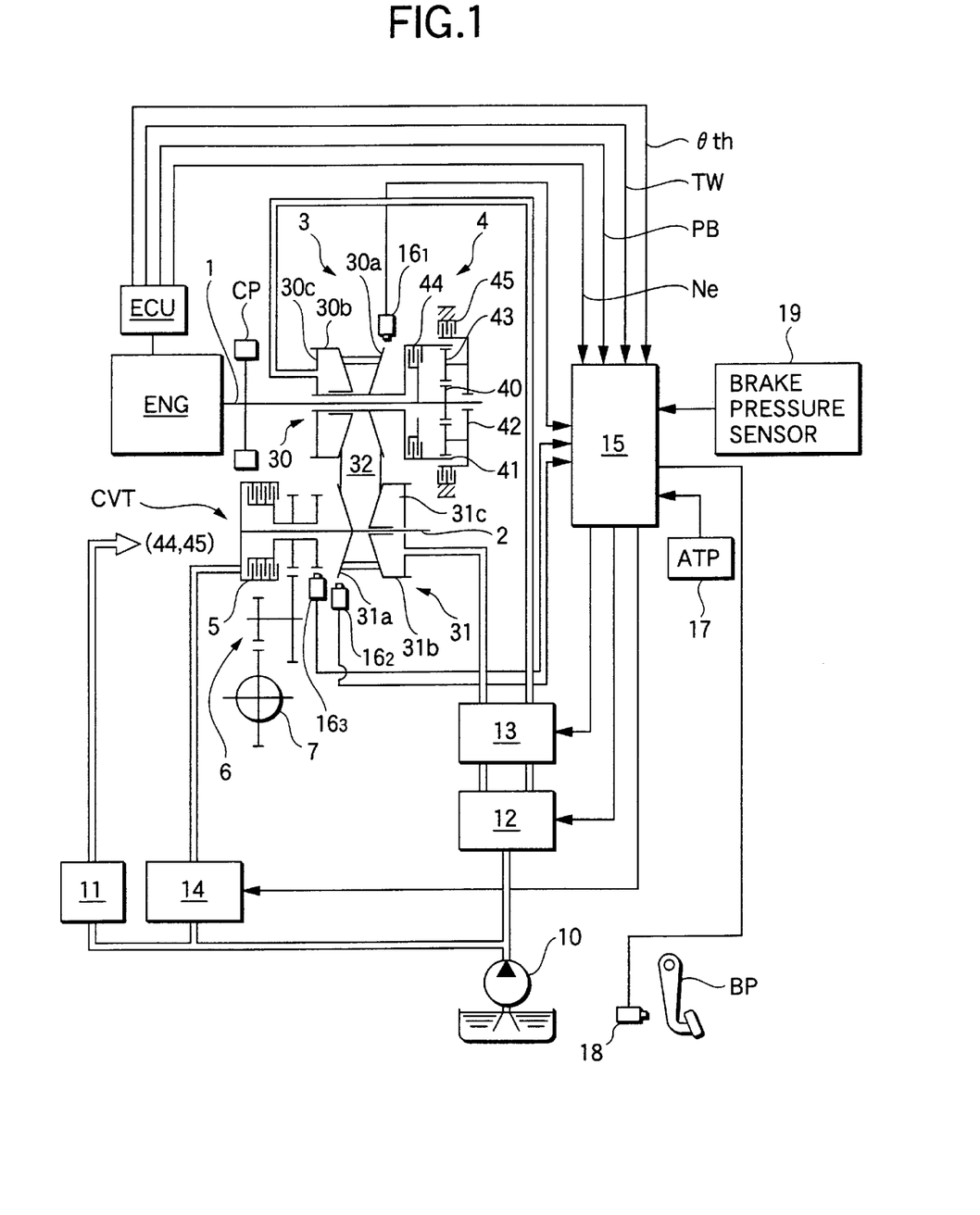
FIG. 1 is a skeleton diagram showing one example of a transmission device provided with a starter clutch which is a target to be controlled by a control device according to the invention.

FIG. 1 shows a belt-type continuously variable transmission CVT as a transmission device for transmitting an output torque of an engine ENG to drive wheels of a vehicle.

The continuously variable transmission comprises a V-belt mechanism 3 disposed between an input shaft 1 connected to the engine ENG via a coupling mechanism CP and an output shaft 2, a forward-reverse switching mechanism 4 and a starter clutch 5 disposed on an output side of the V-belt mechanism 3.

The V-belt mechanism 3 is constituted by a drive pulley 30 rotatably supported on the input shaft 1, a driven pulley 31 connected to the output shaft 2 in such a manner as not to rotate thereon and a metallic V belt 32 extended between the two pulleys 30, 31. The respective pulleys are made up by stationary sheaves 30a, 31a, movable sheaves 30b, 31b movable in axial directions relative to the stationary sheaves 30a, 31a and cylinder chambers 30c, 31c for pressing the movable sheaves 30b, 31b against the stationary sheaves 30a, 31a, whereby a suitable pulley side pressure is generated which does not cause the belt 32 to slip by suitably controlling a pressure (a pulley control pressure) supplied to the cylinder chambers 30c, 31c of the respective pulleys 30, 31 and the diameter of a circle around which the belt 32 is wound is changed by changing a:pulley width between the two pulleys 30, 31 to perform continuously variable gear shifting.

The forward-reverse shifting mechanism 4 is made up by a planetary gear mechanism comprising a sun gear 40 connected to the input shaft 1, a ring gear 41 connected to the drive pulley 30, a carrier 42, planetary gears 43 rotatably supported on the carrier 42 and adapted to mesh with the sun gear 40 and the ring gear 41, a forward clutch 44 which can connect the input shaft 1 with the ring gear 41 and a reverse brake 45 which can be fixed to the carrier 42. When the forward clutch 44 is brought into engagement, the ring gear 41 rotates together with the input shaft 1, and the drive pulley 30 is driven in the same direction as that in which the input shaft 1 is driven (forward direction). In addition, when the reverse brake 45 is brought into engagement, the ring gear 41 is driven in an opposite direction to that in which the sun gear 40 is driven, and the drive gear 30 is driven in an opposite direction to which the input shaft is driven (reverse direction). When both the forward clutch 44 and the reverse brake 45 are released, the power transmission via the forward-reverse switching mechanism 4 is interrupted.

The starter clutch 5 is connected to the output shaft 2, and when the starter clutch 5 is brought into engagement, the engine output the speed of which is changed with the V-belt mechanism 3 is transmitted to a differential mechanism 7 via a gear train 6 on an output side of the starter clutch 5, and the driving force is then transmitted to left and right wheels (not shown) of the vehicle from the differential mechanism 7. When the starter clutch 5 is released, no power is transmitted, and the continuously variable transmission CVT is put in a neutral state.

Provided along a hydraulic pressure control circuit of the continuously variable transmission CVT are a hydraulic pump 10 driven by the engine ENG, a manual valve 11 interlocked with a shift lever, not shown, so as to be operated by the shift lever to be switched for controlling the supply and discharge of fluid to and from the forward clutch 44 and the reverse brake 45, a pulley side pressure control valve 12 for producing a pulley control hydraulic pressure for supply to the cylinder chambers 30c, 31c of the drive pulley 30 and the driven pulley 31, a gear shift control valve 13 for controlling the supply of a pulley control hydraulic pressure to the respective cylinder chamber 30c, 31c and a clutch control valve 14 for controlling the hydraulic fluid pressure that is to be supplied to the starter clutch 5.

The pulley side pressure control valve 12, the gear shift control valve 13 and the clutch control valve 14 are each constituted by a linear solenoid valve controlled by a controller 15 and output a hydraulic pressure proportional to the value of a current supplied to solenoids thereof, respectively. Inputted into the controller 15 from an engine control unit ECU are signals indicating the number of speed Ne of the engine ENG, depression at engine manifold PB, engine coolant temperature TW and throttle opening θth. Also inputted into the controller 15 from first to third speed sensors $16_1$, $16_2$, $16_3$ are signals indicating the numbers of speeds of the drive pulley 30, the driven pulley 31 and the output side of the starter clutch 5, respectively. Moreover, inputted into the controller 15 are signals from a shift range detector 17 for detecting the shift range position or automatic transmission position ATP based on the positions of the shift lever and the manual valve 11, a brake operation detector 18 for detecting the depressing operation of a brake pedal BP and a brake pressure sensor 19 for detecting the pressure of brake fluid.

A description will be given below of the control of the clutch control valve 14 by the controller 15 or the control of the starter clutch 5.

Figure 2:
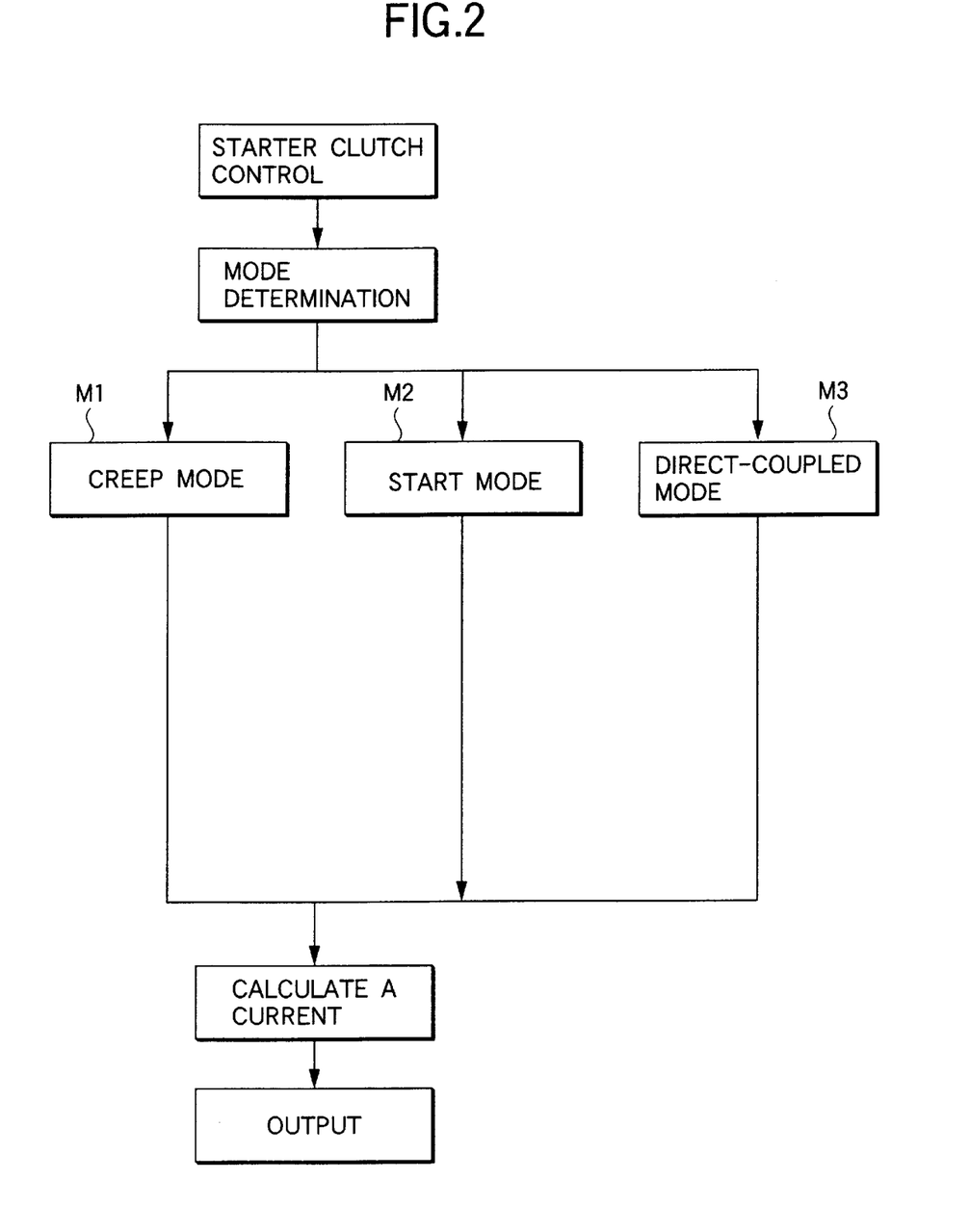
FIG. 2 is a flowchart showing schematically the control of the starter clutch.

As shown in FIG. 2, the control of the starter clutch 5 is divided into three modes such as a creep mode M1, a start mode M2 and a direct-coupled mode M3. The creep mode M1 is selected when the engine ENG is in an idling state and the vehicle speed is zero or very slow (for example, 3 km/h). The start mode M2 is selected when the vehicle starts off (when the accelerator pedal is depressed and the vehicle speed ranges from zero to a low speed (for example, 30 to 40 km/h)), and the direct-coupled mode M3 is selected when the vehicle runs at steady speed. The fluid pressure of the starter clutch 5 (clutch pressure) is determined in response to the mode selected, and a current value is calculated which generates the clutch pressure, the current value so calculated being outputted to the solenoid of the clutch control valve 14. Notice that in the start mode M2, as seen in JP-B-6-26943, the clutch pressure is set based on the degree of slippage of the starter clutch 5 (obtained from detected values of the second and third speed sensors $16_2$, $16_3$) and the number of speeds Ne of the engine so that the vehicle can start smoothly. In addition, in the direct-coupled mode M3, the clutch pressure is determined based on the number of speeds Ne, an engine torque estimated from of the depression at engine manifold PB and the degree of slippage of the starter clutch 5.

Figure 3:
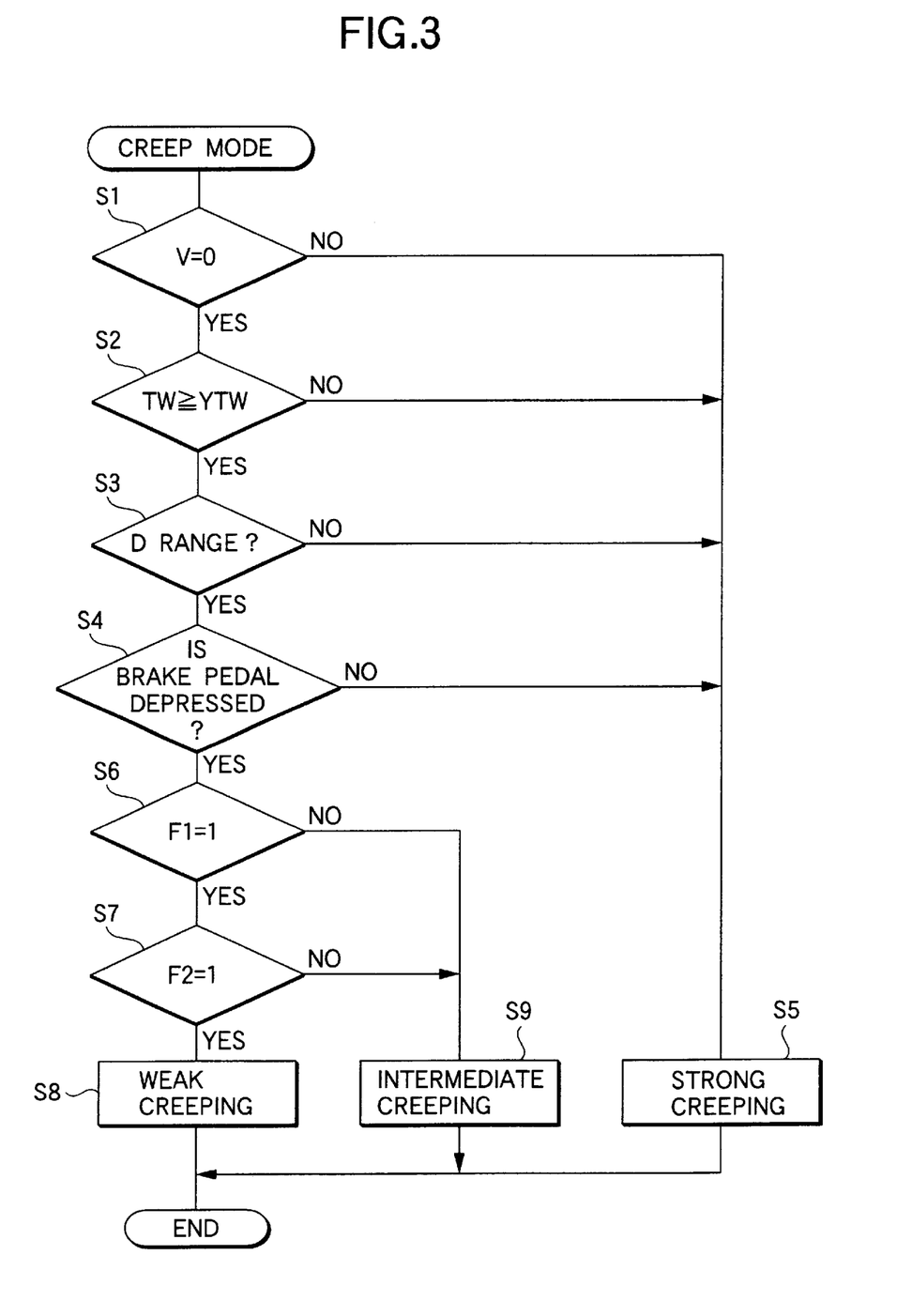
FIG. 3 is a flowchart showing a control program for the starter clutch in a creep mode.

As shown in FIG. 3, when the creep mode M1 is selected, first, in Step S1, whether or not the third speed sensor $16_3$ has detected the speed of the output side of the starter clutch 5 or whether or not the vehicle speed V is zero is determined. If V=0, in Step S2, whether or not the coolant temperature TW is equal to or higher than a predetermined temperature YTW is determined. If TW≧YTW, then the flow advances to Step S3, where whether or not the shift range is in the D range which is an automatic shift range for forward is determined based on a signal from the shift range detector 17. If in the D range, in Step S4, whether or not the brake pedal BP is depressed is determined based on a signal from the brake operation detector 18.

If any of the four conditions such as V=0, TW≧YTW, D range and the depressed brake pedal is not established, the flow advances to Step S5, and the clutch pressure is set to a value (a strong creep pressure) which obtains a sufficient creep torque to allow the vehicle to creep. On the contrary, when the four conditions are established, in Step S6, whether or not a first flag F1 which is described in detail later, is set to "1" is determined. If F1=1, in Step S7, whether or not a second flag F2 which is described in detail later, is set to "1" is determined. Then, if F2=1, the flow advances to Step S8, and the clutch pressure is set to a value (a weak creep pressure) which allows an unavailable stroke (a play before a clutch plate starts to engage) of a piston of the starter clutch 5 to be removed for a slight torque to be transmitted. In addition, if F1=0 or F2=0, the flow advances to Step S9, the clutch pressure is set to a value (an intermediate creep pressure) which is smaller than the strong creep pressure but is larger than the weak creep pressure.

Figure 4:
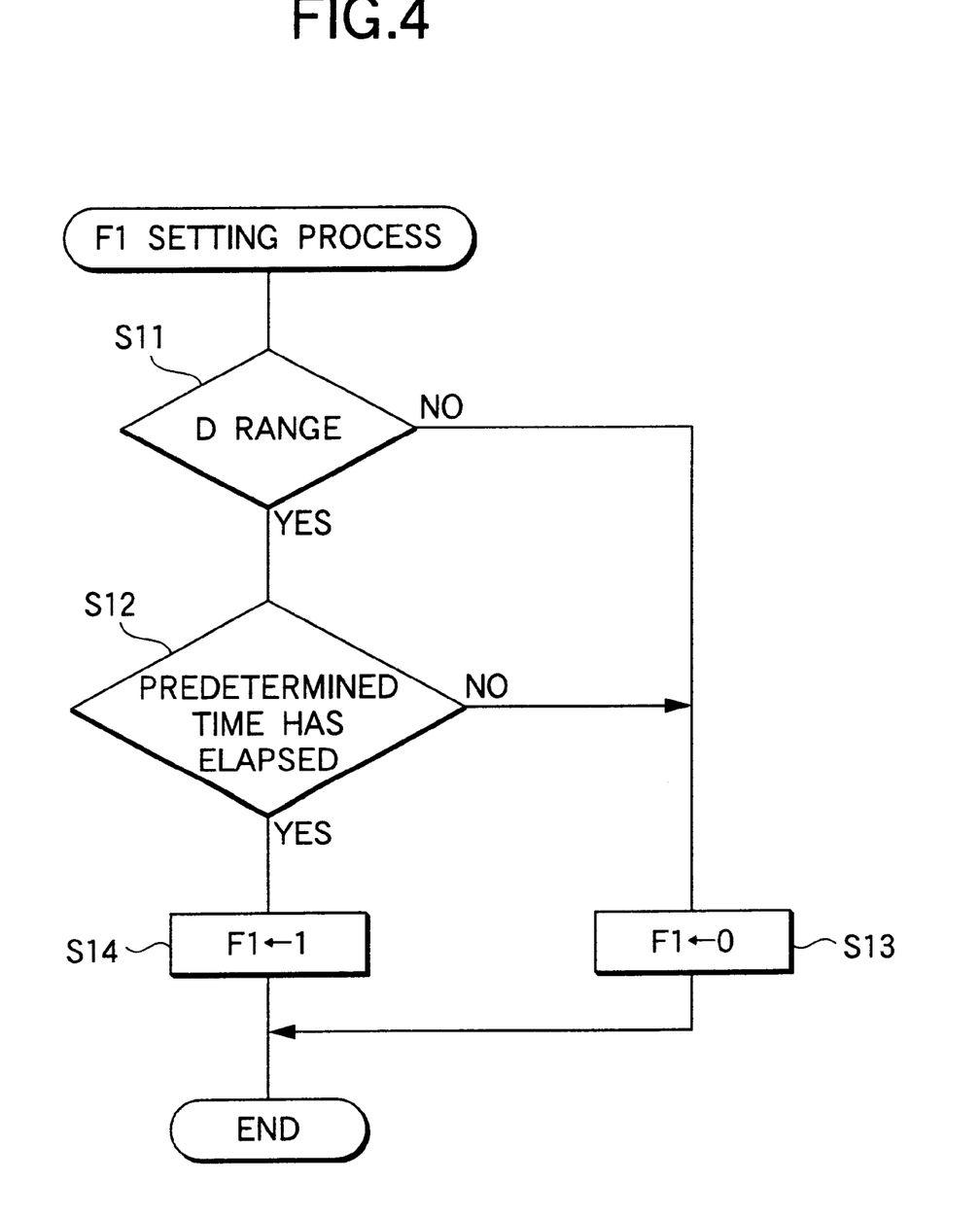
FIG. 4 is a flowchart showing a sub-routine for performing a setting process of a first flag F1 for use in control in the creep mode.

The first flag F1 is a flag which is to be set to "1" when a predetermined time has elapsed since the shift lever is switched to the D range. A detailed process in which the first flag F1 is set is as shown in FIG. 4. First, in Step S11, whether or not the current shift range is the D range is determined, and if it is the D range, in Step S12, whether or not a predetermined time (for example, fifteen seconds) has elapsed since the shift was switched to the D range is determined. If the range is not the D range or the predetermined time has not yet elapsed since the switch to the D range was effected, in Step S13, the first flag F1 is reset to "0", whereas when the predetermined time has elapsed since the switch to the D range occurred, in Step S14, the first flag F1 is set to "1". Thus, when the shift is initially switched to the D range, F=0, and the flow advances from Step S6 to Step S9, where the clutch pressure is set to the intermediate creep pressure. Due to this, the delay in rising of the transmitting torque of the starter clutch 5 when starting immediately after the shift is switched to the D range is improved and the vehicle can start with good responsibility.

Figure 5:
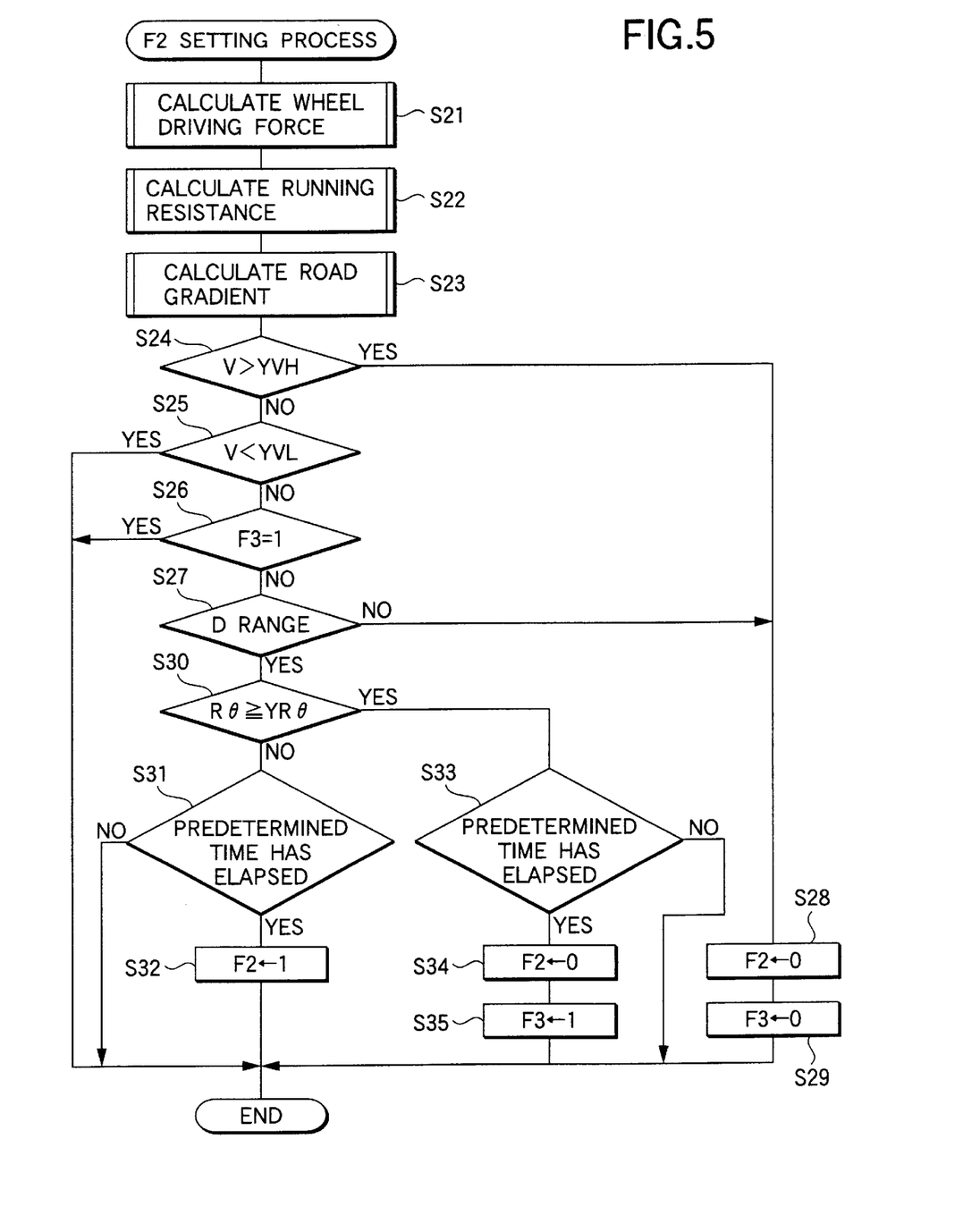
FIG. 5 is a flowchart showing a sub-routine for performing a setting process of a second flag F2 for use in control in the creep mode.

The second flag F2 is a flag which is to be set to "1" when the gradient Rθ of a road which is calculated from the wheel driving force and vehicle acceleration is smaller than a predetermined ascending gradient YRθ. A detailed process in which the second flag F2 is set is shown in FIG. 5. First, in Step S21, the wheel driving force is calculated, in Step S22, the running resistance of the vehicle is calculated and in Step S23, the gradient Rθ of a road is calculated. Next, in Step S24, whether or not the vehicle speed V exceeds an upper limit speed YVH (for example, 35 km/h) for determination of gradient. If V≦YVH, in Step S25, whether or not the vehicle speed V is lower than a lower limit YVL (for example, 10 km/h) for determination of gradient is determined. Then, if YVL≦V≦YVH, in Step S26, whether or not a third flag F3 which is described later, is set to "1" is determined. If F3=0, in Step S27, whether or not the current shift range is the D range is determined. If V>YVH or the shift range is not the D range, then, in Step S28, the second flag F2 is reset to "0", and in Step S29, the third flag F3 is reset to "0". Additionally, if V<YVL or F3=1, the process is completed as it is.

In the event that the shift range is the D range, in Step S30, whether or not the gradient of the road Rθ is equal to or larger than the predetermined ascending gradient YRθ is determined. If Rθ<YRθ, in Step S31, whether or not the predetermined time has elapsed or whether or not Rθ<YRθ after the predetermined time has elapsed is determined. Then, when the predetermined time has elapsed, the flow advances to Step S32, where the second flag F2 is set to "1". On the contrary, if Rθ≧YRθ, in Step S33, whether or not the predetermined time has elapsed or whether or not Rθ≧YRθ after the predetermined time has elapsed is determined, and when the predetermined time has elapsed, the flow advances to Step S34, where the second flag F2 is reset to "0", and in Step S35, the third flag F3 is set to "1". Thus, if it is determined that Rθ≧YRθ after the predetermined time has elapsed while running with YVL≦V≦YVH in the D range, the second flag F2 is set as F2=0, and the flow advances from Step S7 to Step S9, where the clutch pressure is set to the intermediate creep pressure. Thus, when the vehicle is stopped on an ascending slope of the predetermined gradient of YRθ or larger, even if the brake pedal is depressed, the clutch pressure is not decreased to the weak creep pressure. Due to this, when the depressing force on the brake pedal BP is released, the creep torque is allowed to rise with good responsibility to a torque which can counteract against a reverse torque caused by the gravity of the vehicle. Consequently, the accelerator pedal does not have to be depressed in a panic fashion immediately after the brakes are released, and a start operation on the ascending slope is facilitated.

Figure 6:
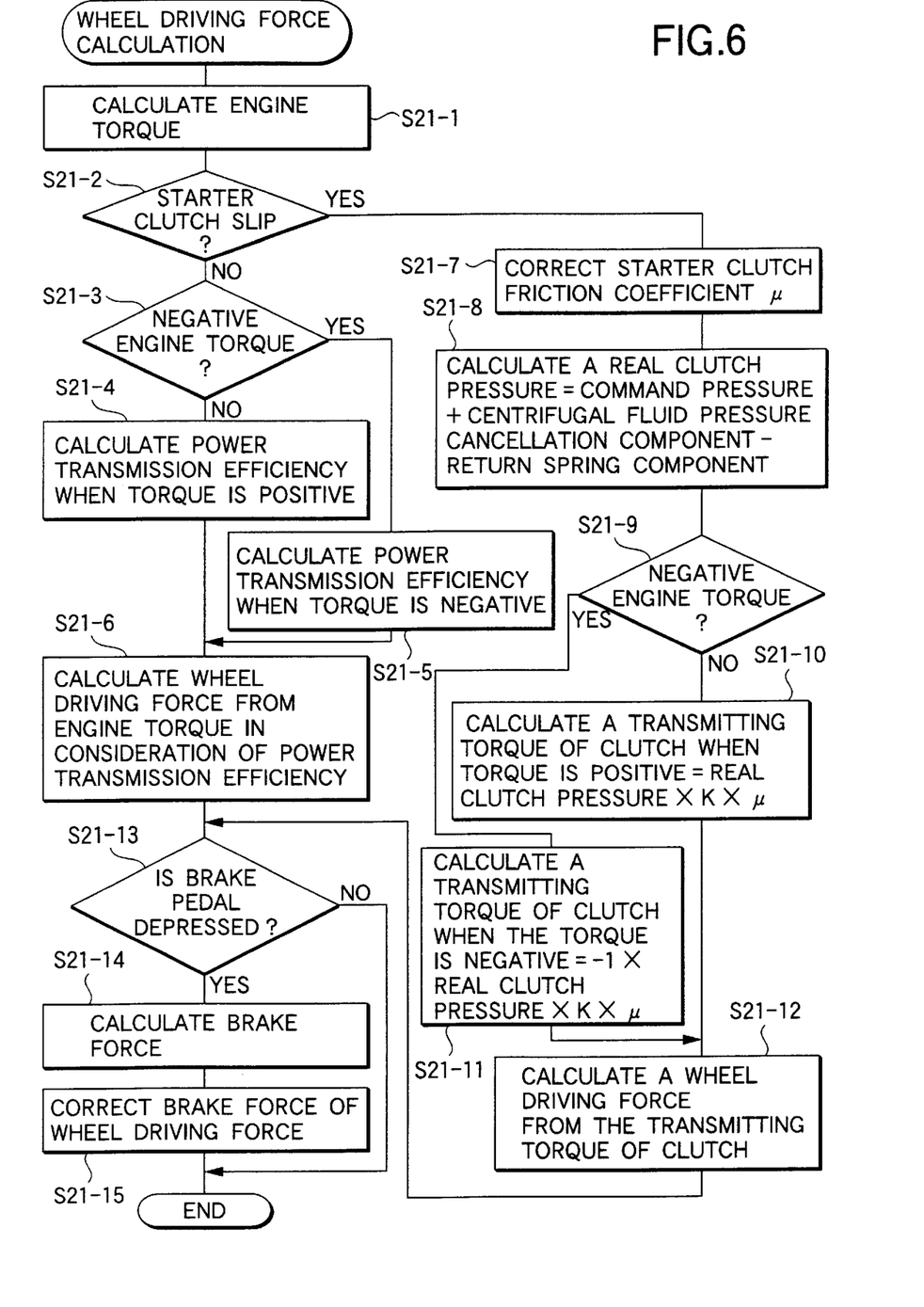
FIG. 6 is a flowchart showing the contents of a wheel driving force calculating process which is included in the setting process of the second flag F2.

A calculating process for the wheel driving force carried out in Step S21 is shown in FIG. 6. First, in Step S21-1, the output torque of the engine ENG (engine torque) is obtained through map reference using the engine speed Ne and the depression at engine manifold PB as parameters, and then in Step S21-2, whether or not the starter clutch 5 slips based on detected values of the second and third speed sensors 1621 163 is determined. If the starter clutch does not slip, in Step S21-3, whether or not the engine torque is negative or whether or not the engine brake is being applied is determined. Then, if the engine torque is positive, in Step S21-4, the efficiency of power transmission when the torque of the continuously variable transmission CVT is positive is calculated, and on the contrary, if the engine torque is negative, in Step S21-5, the efficiency of power transmission when the torque of the continuously variable transmission CVT is negative is calculated. Next, the flow advances to Step 21-6, the engine torque is multiplied by the efficiency of power transmission of the continuously variable transmission CVT, the ratio of the V-belt mechanism 3 and the ratio of the gear train 6 and is divided by the radius of the wheel, to thereby calculate the wheel driving force.

When the starter clutch slips, in Step S21-7, the coefficient of friction $\mu$ of the starter clutch is corrected in response to the difference in revolution between the input side and the output side of the starter clutch 5. Next, in Step 21-8, the engagement force of the starter clutch 5 or the real clutch pressure is calculated. Here, a canceler mechanism is incorporated in the starter clutch 5 for regulating the increase in clutch pressure due to a centrifugal force, but the increase in clutch pressure due to a centrifugal force cannot perfectly be prevented by the canceler mechanism. Therefore, an increased component of the clutch pressure that cannot be prevented by the canceler mechanism is added to a command value of the clutch pressure as a centrifugal fluid pressure cancellation component, and a fluid pressure corresponding to the return spring of the clutch piston is subtracted from that value to calculate a real clutch pressure. Then, in Step 21-9, whether the engine torque is positive or negative is determined, and if the engine torque is positive, in Step S21-10, the real clutch pressure is multiplied by a constant K set in response to the number of clutch plates of the starter clutch 5, the effective radius thereof or the like, and the friction coefficient $\mu$ of the starter clutch 5 so as to calculate a transmitting torque of the starter clutch 5. On the contrary, if the engine torque is negative, in Step S21-11, the real clutch pressure is multiplied by the constant K and the friction coefficient $\mu$ and "−1" to thereby calculate a transmitting torque of the starter clutch as a negative value. Next, in Step S21-12, the transmitting torque of the starter clutch 5 is multiplied by the ratio of the gear train 6 and is divided by the wheel radius to thereby calculate a wheel driving force.

As has been described heretofore, in Step S21-6, the wheel driving force is calculated based on the engine torque, or in Step S21-12, the wheel driving force is calculated based on the transmitting torque of the starter clutch 5. Next, in Step 21-13, whether or not the brake pedal BP is depressed is determined, and if depressed, in Step S21-14, a brake pressure is calculated based on the brake fluid pressure, and in Step S21-15, the wheel driving force is subtracted for correction in response to the brake pressure.

Figure 7:
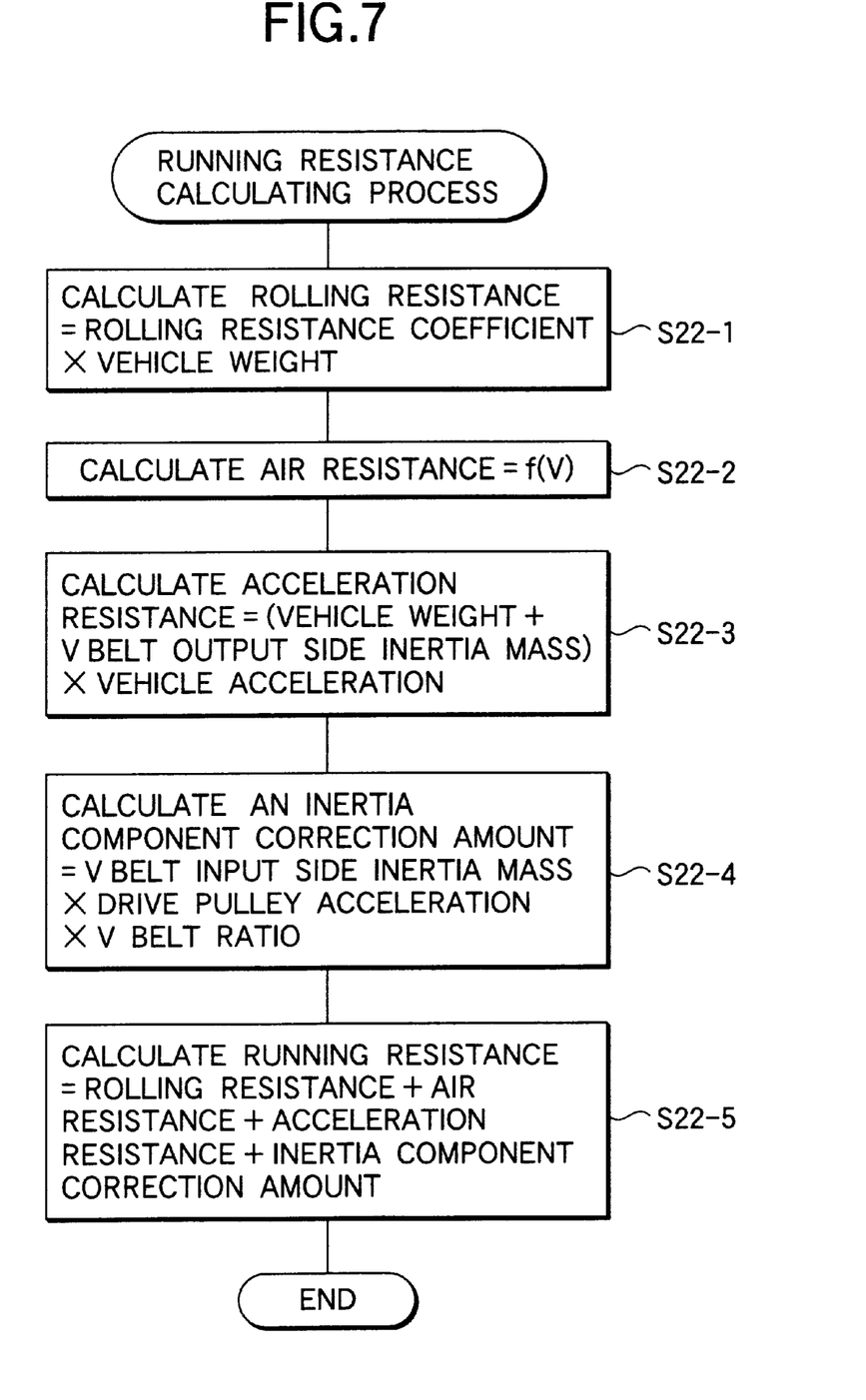
FIG. 7 is a flowchart showing the contents of a running resistance calculating process which is included in the setting process of the second flag F2.

A detailed calculating process of running resistance carried out in Step S22 is shown in FIG. 7. First, in Step S22-1, a rolling resistance is calculated by multiplying the vehicle weight by the coefficient of rolling resistance, and in Step S22-2, an air resistance is obtained through table reference using the vehicle speed as a parameter. Next, the flow advances to Step S22-3, an equivalent inertia mass of a rotational member on an output side of the V-belt mechanism 3 which rotationally varies in synchronism with a change in vehicle speed is added to the vehicle weight, and the resultant value is multiplied by the variation velocity of the vehicle speed or acceleration of the vehicle, to thereby obtain an acceleration resistance. Next, the flow advances to Step S22-4, an equivalent inertia mass of a rotational member on an input side of the V-belt mechanism 3 which rotationally varies in synchronism with a change in engine speed Ne is multiplied by the rotational acceleration of the drive pulley 30 and the ratio of the V-belt mechanism 3, to thereby calculate an inertia correction amount due to a change in engine speed Ne. Finally, in Step S22-5, a running resistance is obtained by adding the rolling resistance, air resistance, acceleration resistance and inertia correction amount.

Figure 8:
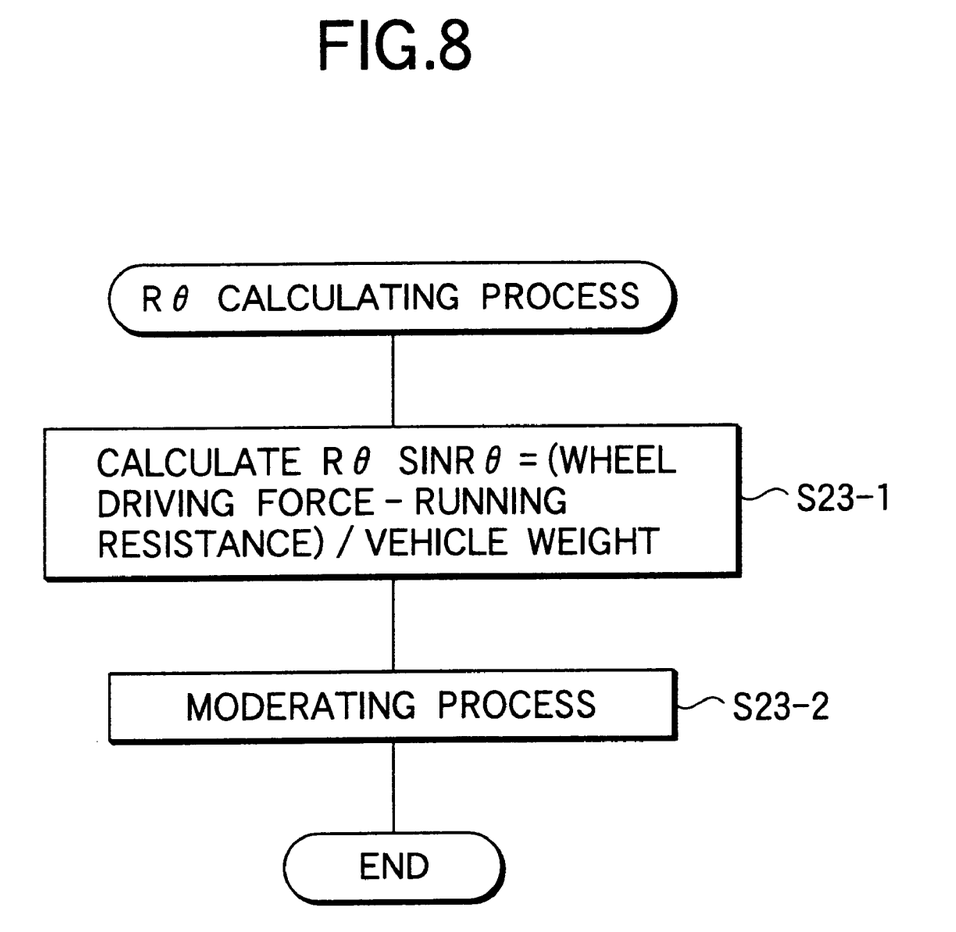
FIG. 8 is a flowchart showing the contents of a road gradient calculating process which is included in the setting process of the second flag F2.

Here, the propelling force of the vehicle is the wheel driving force, and a force resisting the propelling force is the running resistance and reversing force due to the road gradient (=vehicle weight×sin R$\theta$), and the following expression will be established:

Wheel driving force=running resistance+vehicle weight× sin R$\theta$) Then, in the calculating process of the road gradient R$\theta$ in Step S23, as shown in FIG. 8, in Step S23-1, the running resistance is subtracted from the wheel driving force, and the resultant value is divided by the vehicle weight to thereby calculate a road gradient R$\theta$ as its sine value sin R$\theta$. Next, in Step S23-2, an moderating process of the road gradient R$\theta$ is performed by weighting and averaging the calculated gradient value.

When the starter clutch 5 slips, a torque equal to or exceeding a transmitting torque of the starter clutch 5 is no more transmitted to the wheels, and the wheel driving force calculated based on the engine torque in Step 21-6 does not coincide with the actual wheel driving force. However in the embodiment, when the starter clutch 5 slips, in Step S21-12, the wheel driving force is calculated based on the transmitting torque of the starter clutch 5, and the wheel driving force is then used for calculation of the road gradient R$\theta$, and therefore, even in a state in which the starter clutch 5 slips, the road gradient R$\theta$ can accurately be calculated, whereby the control of the starter clutch R$\theta$ in the creep mode can properly be performed in response to the road gradient R$\theta$.

Note that in the above embodiment, while the flow is set such as to advance to Step S9 when the road gradient R$\theta$ is equal to or larger than the predetermined ascending gradient YR$\theta$ to set the clutch pressure to the intermediate creep pressure, the flow may be set such as to advance to Step S5 when R$\theta \geq$ YR$\theta$ so as to set the clutch pressure to the strong creep pressure.

While only certain embodiments of the invention have been specifically described herein, it will be apparent that numerous modifications may be made thereto without departing from the spirit and scope of the invention.

As is clear from the above description, according to the road gradient detecting device of the invention, even in a state in which the starter clutch slips, the road gradient can accurately be calculated. In addition, according to the starter clutch controlling device of the invention, the control of the starter clutch when the vehicle is at a stop can properly be attained in response to the road gradient, whereby the reliability is improved.

What is claimed is:

1. A road gradient detecting device for a vehicle in which wheels are driven by an engine via a transmission device having a starter clutch, comprising:

a road gradient calculating unit calculating a road gradient from a wheel driving force and a vehicle acceleration;

a first driving force calculating unit calculating the wheel driving force based on an output torque of said engine; and a second driving force calculating unit calculating the wheel driving force based on a torque transmitted by said starter clutch, said torque being obtained by an engagement force of said starter clutch, wherein, in a state that said starter clutch slips, the road gradient is calculated by using the wheel driving force calculated by said second driving force calculating unit.

2. The road gradient detecting device according to claim 1, wherein the road gradient calculating unit calculates the road gradient from the wheel driving force, a running resistance calculated from the vehicle acceleration and a vehicle weight.

3. The road gradient detecting device according to claim 1, further comprising:

a slippage detecting unit detecting a slippage of said starter clutch based on a rotation speed of a driven pulley and a rotation speed of said starter clutch.

4. A starter clutch controlling device for controlling an engagement force of a starter clutch provided in a transmission device for transmitting an output torque of an engine to wheels, comprising:

a first controlling unit setting the engagement force of said starter clutch when a vehicle is stopped with a brake pedal being depressed, into a first value which is lower than a second value being the engagement force of said starter clutch when said brake pedal is not depressed;

a road gradient detecting device according to claim 1, for detecting a road gradient; and a second controlling unit setting the engagement force of said starter clutch when said vehicle is stopped with said brake pedal being depressed in a case that the road gradient is an ascending gradient of a predetermined value or greater, into a third value which is greater than the first value obtained by said first controlling unit.

5. The starter clutch controlling device according to claim 4, wherein said second controlling unit sets the engagement force of said starter clutch when said vehicle is stopped with said brake pedal being depressed in a case that an elapsed time since a shift range is switched to the drive range is within a predetermined time, into the third value which is greater than the first value obtained by said first controlling unit.

6. The starter clutch controlling device according to claim 4, wherein the third value obtained by said second controlling unit is equal to the second value.

* * * * *